C.-L. WESTERMAN.
Egg-Tester.

No. 204,117. Patented May 21, 1878.

Witnesses
Fred. G. Dieterich
Annie K. Dieterich

Inventor
Conrad L. Westerman
by D. C. Allen
atty.

UNITED STATES PATENT OFFICE.

CONRAD L. WESTERMAN, OF BLOOMINGTON, ILLINOIS.

IMPROVEMENT IN EGG-TESTERS.

Specification forming part of Letters Patent No. 204,117, dated May 21, 1878; application filed April 18, 1878.

*To all whom it may concern:*

Be it known that I, CONRAD L. WESTERMAN, of Bloomington, in the county of McLean, and in the State of Illinois, have invented certain new and useful Improvements in Egg-Testers; and do hereby declare that the following is a full, clear, and exact description thereof, reference being had to the accompanying drawing, and to the letters of reference marked thereon, making a part of this specification, and in which—

Figure 1:
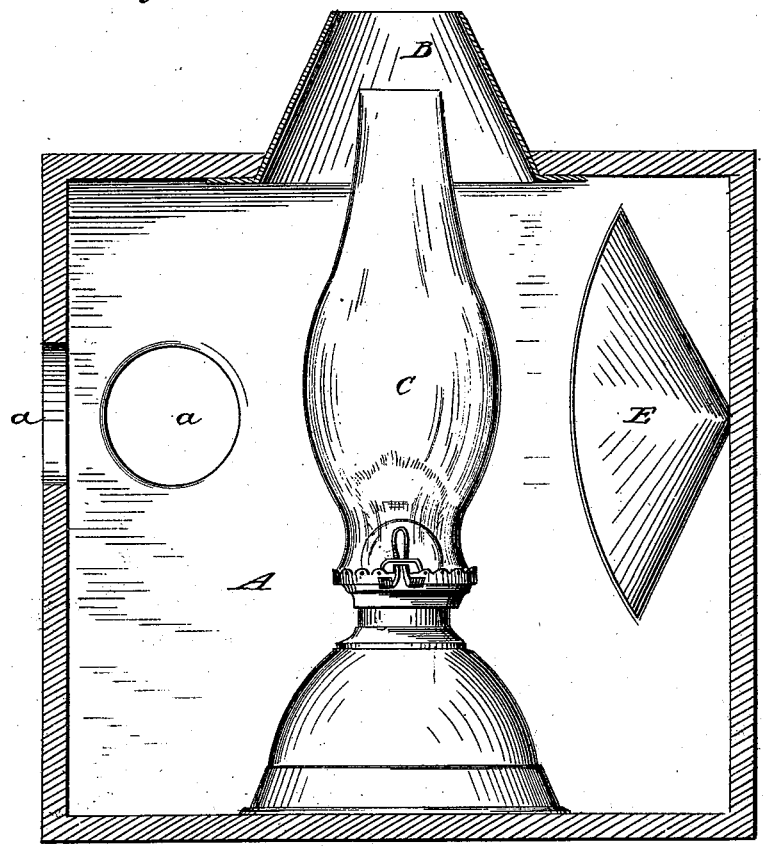
Figure 2:
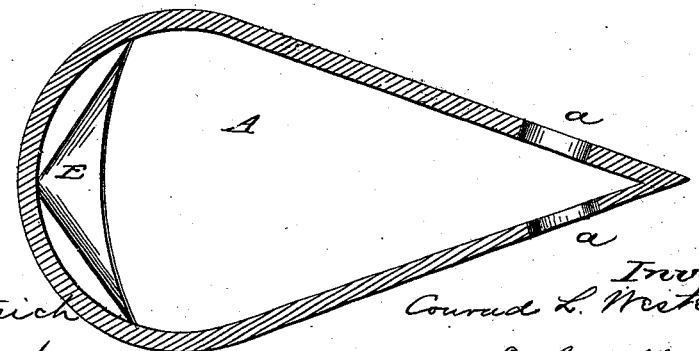

Figure 1 is a vertical sectional view. Fig. 2 is a modification of the case.

This invention relates to improvements in egg-testers, having for its object simplicity in the construction of the egg-testing case, while increasing the facility of testing eggs; and to this end the invention consists in an egg-testing case, as a new article of manufacture, having a lamp-flue, and openings through adjacent sides of the case, whereby the operator is enabled to test two eggs at the same time, all as will be hereinafter fully described.

In the drawing, A represents the egg-testing case, which can be made square, triangular, or oval-shaped, as shown in Figs. 1 and 2. This case is provided with the usual lamp-flue B, immediately under which the lamp C, for illuminating the interior of the case, is placed. The case is also provided with openings $a$ $a$, through adjacent sides of the case, to which the eggs to be tested are placed. By this arrangement of the egg-openings through the adjacent sides of the case, the operator is enabled to test two eggs at the same time, and see the condition of both eggs at a glance, without changing his position. The testing-case can also be provided with the usual interior reflecting devices, as shown at E in Figs. 1 and 2.

In testing eggs with the above-described device, the operator takes two eggs in each hand, places one of the eggs in each hand to each of the openings $a$ $a$ through adjacent sides of the case. The strong interior light from the lamp within the case, passing through the two eggs thus presented, enables the operator to quickly test the same, and while taking a hasty observation of the two eggs thus presented, the operator can, by a skillful movement of the fingers, bring the remaining two eggs (one in each hand) to take the place of the two eggs already presented, thus enabling a person used to testing eggs for this purpose to test them at an astonishing rapidity.

The egg-tester operates best in a cellar or other dark place where eggs are generally kept.

I am aware that an egg-tester having a top plate that receives eggs in its apertures, a reflector within the body, and a lamp in the center, and also a case having an inside lamp, and a tube at an angle to and a little above burner of lamp, having an egg-holding cup arranged in its outer end, is old, and such I do not desire to claim, broadly, as my invention; but—

Having thus fully described my invention, what I claim as new, and desire to secure by Letters Patent, is—

As a new article of manufacture, the herein-described egg-testing case A, having a lamp-flue, B, and egg-openings $a$ $a$ through adjacent sides of the case, and near one corner thereof, whereby the operator is enabled to test eggs in each hand at the same time, as specified.

In testimony that I claim the foregoing I have hereunto set my hand this 5th day of April, 1878.

CONRAD L. WESTERMAN.

Witnesses:
   THOMAS SLADE,
   LUCIUS L. HOLMES.